(12) United States Patent
Noh et al.

(10) Patent No.: US 9,445,074 B2
(45) Date of Patent: Sep. 13, 2016

(54) APPARATUS AND METHOD FOR DEPTH MANIPULATION OF STEREOSCOPIC 3D IMAGE

(71) Applicant: KOREA ADVANCED INSTITUTE OF SCIENCE AND TECHNOLOGY, Daejeon (KR)

(72) Inventors: Jun Yong Noh, Daejeon (KR); Sang Woo Lee, Seoul (KR); Young Hui Kim, Gyeonggi-do (KR); Jung Jin Lee, Daejeon (KR); Kye Hyun Kim, Daejeon (KR); Kyung Han Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 580 days.

(21) Appl. No.: 13/905,418

(22) Filed: May 30, 2013

(65) Prior Publication Data

US 2014/0118507 A1    May 1, 2014

(30) Foreign Application Priority Data

Oct. 26, 2012    (KR) .......................... 10-2012-0119987

(51) Int. Cl.
   *H04N 13/00*    (2006.01)
(52) U.S. Cl.
   CPC ................................. *H04N 13/0022* (2013.01)
(58) Field of Classification Search
   None
   See application file for complete search history.

(56) References Cited

U.S. PATENT DOCUMENTS

| 6,674,877 B1* | 1/2004 | Jojic | G06K 9/00369 |
| | | | 348/169 |
| 2009/0116732 A1* | 5/2009 | Zhou | H04N 13/0029 |
| | | | 382/154 |

(Continued)

OTHER PUBLICATIONS

Wang et al. "Automatic natural video matting with depth", Computer Graphics and Applications, 2007. PG'07, 15th Pacific Conference on IEEE, 2007.*

(Continued)

*Primary Examiner* — Tracy Li
*Assistant Examiner* — Mohammad J Rahman (57) ABSTRACT

Provided are an apparatus and a method for manipulating depth of a stereoscopic image that enable a user to manipulate depth of a stereoscopic image easily and intuitively. The apparatus may include: a histogram analyzing unit acquiring a depth distribution chart by performing histogram analysis of a disparity map corresponding to an input image; a Gaussian mixture model (GMM) fitting unit acquiring multiple depth layers by performing GMM fitting of the depth distribution chart; a disparity adjusting unit adjusting at least one of a position and a volume of at least one of the multiple depth layers and calculating a disparity mapping function on which a result of the adjustment is reflected in response to a user request; and a disparity map recalculating unit calculating a new disparity map by optimizing the disparity mapping function.

13 Claims, 7 Drawing Sheets

(56) References Cited

U.S. PATENT DOCUMENTS

| | | | | |
|---|---|---|---|---|
| 2014/0333739 A1* | 11/2014 | Yang | H04N 13/0011 | 348/54 |
| 2014/0333764 A1* | 11/2014 | Venkataraman | H01L 27/14618 | 348/135 |
| 2010/0007717 A1* | 1/2010 | Spektor | G06K 9/00355 | 348/43 |
| 2011/0102553 A1* | 5/2011 | Corcoran | G06K 9/00281 | 348/50 |
| 2012/0309517 A1* | 12/2012 | Al-Ghosien | H04N 13/0253 | 463/31 |
| 2013/0010079 A1* | 1/2013 | Zhang | H04N 13/0207 | 348/47 |
| 2013/0129194 A1* | 5/2013 | Gusis | G06T 5/50 | 382/154 |
| 2013/0162631 A1* | 6/2013 | Chang | G06T 7/0061 | 345/419 |
| 2013/0230237 A1* | 9/2013 | Schlosser | G06T 7/0081 | 382/164 |
| 2013/0301908 A1* | 11/2013 | Shim | G06T 5/005 | 382/154 |
| 2013/0314501 A1* | 11/2013 | Davidson | H04N 13/0011 | 348/46 |
| 2014/0049613 A1* | 2/2014 | Pizlo | G06T 7/0042 | 348/46 |

(Continued)

OTHER PUBLICATIONS

Zhu et al. "Joint depth and alpha matte optimization via fusion of stereo and time-of-flight sensor," in Computer Vision and Pattern Recognition, 2009. CVPR 2009. IEEE Conference on , vol., No., pp. 453-460, Jun. 20-25, 2009 doi: 10.1109/CVPR.2009.5206520.*

* cited by examiner

APPARATUS AND METHOD FOR DEPTH MANIPULATION OF STEREOSCOPIC 3D IMAGE

CROSS-REFERENCE TO RELATED APPLICATION

This application claims priority of Korean Patent Application No. 10-2012-0119987, filed on Oct. 26, 2012, in the KIPO (Korean Intellectual Property Office), the disclosure of which is incorporated herein entirely by reference.

BACKGROUND OF THE INVENTION

1. Field of the Invention

The present disclosure relates to a post-production technology for producing stereoscopic contents, and more particularly, an apparatus and a method for depth manipulation of a stereoscopic image enabling a user to manipulate the depth of the stereoscopic image easily and intuitively.

2. Description of the Related Art

Stereoscopic 3D (S3D) in which the depth is perceived from two left and right images was first discovered by a Greek mathematician, Euclid B.C. 300. Euclid described that a person perceives depth based on mutually-different sight information of the right eye and the left eye. Thereafter, an Italian mathematician of 15 century, Leonardo da Vinci names such a sight perception process of a person as stereopsis and tried to represent a stereoscopic sense on a flat canvas. In 1838, Sir Charles Wheastone devised a stereoscopic mirror allowing two pictures to be seen on mirrors of mutually-different angles, and this is known as the origination of a stereoscopic image.

As above, the most distinctive feature of a stereoscopic image is that two images to be seen by both left and right eyes are necessary. From the viewpoint of the production of a stereoscopic content, this means that double resultant images are required to be produced from an initial scenario operation to photographing or CG rendering and a final synthesis operation (in an actual production, double or more budget and efforts are known to be required). In addition, in technologies and know-how necessary for the production of stereoscopic content, techniques that are of a higher level and more delicate than those required for the production of a general content in which one image is produced are necessary. The reason for this is that, in a case where stereoscopic images of two left and right images are erroneously produced, and there is an error to some degree that cannot be perceived by a person, dizziness or pain in the eyes may be caused.

First, a scenario production for left and right images needs to be designed from a pre-production operation. Second, in a production operation, when images are to be photographed, two cameras need to be arranged so as to photograph left and right images, and additional devices and staffs for the operation are necessary. On the other hand, when a stereoscopic CG content is produced without photographing images, two virtual CG cameras are arranged, and the CG contents are respectively rendered, whereby a double rendering time is necessary. Third, in a post-protection operation, operations such as a correction for a stereoscopic image error due to the limit of the production operation and re-adjustment of the depth are further required. Alternatively, many staffs and much efforts are necessary for generating depth information used for generating a stereoscopic content based on a content that has been already produced as a one-eye 2D image (or a single image) in advance and converting the content into two images.

Particularly, a field focused in this disclosure relates to a post-production operation used for adjusting depth. While various methods of adjusting depth are proposed recently, there are disadvantages that conventional methods of adjusting depth, generally, require user's professional knowledge and are mainly performed in a rendering process to which several restrictions for a stereoscopic content are applied. In other words, a method of adjusting depth of a stereoscopic image that enables a user to adjust depth of a stereoscopic image simply and intuitively has not been proposed yet.

SUMMARY OF THE INVENTION

The present disclosure is directed to providing an apparatus and a method for manipulating depth of a stereoscopic image that enable a user to manipulate depth of a stereoscopic image easily and intuitively by proposing a non-linear disparity mapping function that can be used by the user for performing a parameter adjusting operation simply and intuitively.

In one aspect, there is provided a stereoscopic image depth manipulating apparatus including: a histogram analyzing unit acquiring a depth distribution chart by performing histogram analysis of a disparity map corresponding to an input image; a Gaussian mixture model (GMM) fitting unit acquiring multiple depth layers by performing GMM fitting of the depth distribution chart; a disparity adjusting unit adjusting at least one of a position and a volume of at least one of the multiple depth layers and calculating a disparity mapping function on which a result of the adjustment is reflected in response to a user request; and a disparity map recalculating unit calculating a new disparity map by optimizing the disparity mapping function.

In the aspect above, the histogram analyzing unit may further include a function of manipulating a window size used for the histogram analysis in response to a user request.

In the aspect above, the disparity adjusting unit may calculate a disparity mapping function $d_i'$ defined by $$"d_i' = \frac{1}{l}\sum_{j=1}^{l}[d_i - \{(d_i - \mu_i) - (d_i - \mu_i) \cdot v_j\} \cdot \omega_{ij}], \omega_{ij} = \frac{\pi_j \cdot G_j(d_i)}{\sum_{k=1}^{l}\pi_k \cdot G_k(d_i)}"$$

in a case where a user selects one of the multiple depth layers and adjusts the volume of the selected depth layer. Here, $d_i'$ represents a volume-adjusted disparity mapping function, $d_i$ represents a disparity mapping function before adjustment, $l$ represents the number of depth layers, $\mu_j$ represents an average of the j-th Gaussian distribution chart, $v_j$ represents a volume value of the j-th depth layer adjusted by the user, G represents a Gaussian function configuring the GMM, and $\pi$ represents a Gaussian mixture weighting factor.

In the aspect above, the disparity adjusting unit may calculate a disparity mapping function defined by $$"d_i'' = \frac{1}{l}\sum_{j=1}^{l}\{d_i' - (p_j \cdot \omega_{ij})\}, \omega_{ij} = \frac{\pi_j \cdot G_j(d_i)}{\sum_{k=1}^{l}\pi_k \cdot G_k(d_i)}"$$

in a case where a user selects one of the multiple depth layers and adjusts the position of the selected depth layer.

In the aspect above, the disparity map recalculating unit may optimize the disparity mapping function by acquiring a solution of an energy function defined by "$E=E_{CF}+\lambda_o E_N+\lambda_T E_T, E_{CF}=\Sigma_i w_i \cdot (y_i-\phi(x_i))^2, w_i=\Sigma_{I=0}^I \omega_{ij} \cdot \Omega_j$, $$\omega_{ij} = \frac{\pi_j \cdot G_j(d_i)}{\sum_{k=1}^{l} \pi_k \cdot G_k(d_i)},$$

$E_N=\Sigma_i \gamma_i \cdot (\phi''(x_i))^2$, $E_T=\Sigma_i (y_i-\check{y}_i)^2$" using an energy minimization technique. Here, E represents an energy function, $E_{CF}$ represents curve-fitting energy, $E_N$ represents non-linearity suppression energy, $E_T$ represents temporal coherence energy, $\lambda_o$ and $\lambda_T$ represent weighting factors of the non-linearity suppression energy and the temporal coherence energy, $\phi$ represents a fitting function, x and y represent an input value and an output value of the disparity mapping function, $\Omega_j$ represents a weighting factor of the j-th depth layer, G represents a Gaussian function configuring the GMM, $\pi$ represents a Gaussian mixture weighting factor, $\phi''$ represents a derived function (second drive) of $\phi$ representing a change in inclination, $\gamma_i$ represents a weighting factor of the i-th disparity, and $\check{y}$ represents a disparity output of a previous frame.

In the aspect above, the disparity map recalculating unit may be configured to change at least one of $\lambda_o$, $\lambda_T$, and $\Omega_I$ in accordance with a request from a user.

In another aspect, there is provided a method of manipulating depth of a stereoscopic image including: acquiring a depth distribution chart by determining a window size used for histogram analysis with a user's approval and performing the histogram analysis of a disparity map using the window size; acquiring multiple depth layers from the depth distribution chart; selecting at least one of the multiple depth layers with a user's approval, adjusting at least one of a position and a volume of the selected depth layer, and then recalculating a disparity mapping function on which a result of the adjustment is reflected; and calculating a new disparity map by optimizing the disparity mapping function.

In the aspect above, in the recalculating of a disparity mapping function, a disparity mapping function $d_i'$ defined by $$''d_i' = \frac{1}{l}\sum_{j=1}^{l}[d_i - \{(d_i-\mu_i)-(d_i-\mu_i)\cdot v_j\}\cdot \omega_{ij}], \omega_{ij} = \frac{\pi_j \cdot G_j(d_i)}{\sum_{k=1}^{l} \pi_k \cdot G_k(d_i)}''$$

may be calculated in a case where a user selects one of the multiple depth layers and adjusts the volume of the selected depth layer. Here, $d_i'$ represents a volume-adjusted disparity mapping function, $d_i$ represents a disparity mapping function before adjustment, l represents the number of depth layers, $\mu_j$ represents an average of the j-th Gaussian distribution chart, $v_j$ represents a volume value of the j-th depth layer adjusted by the user, G represents a Gaussian function configuring the GMM, and $\pi$ represents a Gaussian mixture weighting factor.

In the aspect above, in the recalculating of a disparity mapping function, a disparity mapping function defined by $$''d_i' = \frac{1}{l}\sum_{j=1}^{l}\{d_i' - (p_j \cdot \omega_{ij})\}, \omega_{ij} = \frac{\pi_j \cdot G_j(d_i)}{\sum_{k=1}^{l} \pi_k \cdot G_k(d_i)}''$$

may be calculated in a case where a user selects one of the multiple depth layers and adjusts the position of the selected depth layer.

In the aspect above, in the calculating of a new disparity map, the disparity mapping function may be optimized by acquiring a solution of an energy function defined by "$E=E_{CF}+\lambda_o E_N+\lambda_T E_T$, $E_{CF}=\Sigma_i w_i \cdot (y_1-\phi(x_i))^2$, $w_i=\Sigma_{j=0}^I \omega_{iI} \cdot \Omega_j$, $$\omega_{ij} = \frac{\pi_j \cdot G_j(d_i)}{\sum_{k=1}^{l} \pi_k \cdot G_k(d_i)},$$

$E_N=\Sigma_i \gamma_i \cdot (\phi''(x_i))^2$, $E_T=\Sigma_i (y_i-\check{y}_i)^2$" using an energy minimization technique. Here, E represents an energy function, $E_{CF}$ represents curve-fitting energy, $E_N$ represents non-linearity suppression energy, $E_T$ represents temporal coherence energy, $\lambda_o$, and $\lambda_T$ represent weighting factors of the non-linearity suppression energy and the temporal coherence energy, $\phi$ represents a fitting function, x and y represent an input value and an output value of the disparity mapping function, $\Omega_j$ represents a weighting factor of the j-th depth layer, G represents a Gaussian function configuring the GMM, $\pi$ represents a Gaussian mixture weighting factor, $\phi''$ represents a derived function (second drive) of $\phi$ representing a change in inclination, $\gamma_i$ represents a weighting factor of the i-th disparity, and $\check{y}$ represents a disparity output of a previous frame.

In the aspect above, in the recalculating of a disparity mapping function, at least one of $\lambda_o$, $\lambda_T$, and $\Omega_j$ may be changed in accordance with a request from a user.

According to the present disclosure, the number of depth layers to be detected can be changed by adjusting the window size used for histogram analysis, and the volume, the position, the weighting factor, and the like of each depth layer can be variously adjusted. Then, a disparity mapping function on which items adjusted by a user are reflected is generated, and the disparity mapping function is optimized, whereby the disparity map is recalculated. In other words, in the present disclosure, the disparity map is recalculated with parameters adjusted by a user being reflected thereon, and accordingly, the depth of a stereoscopic image can be manipulated, whereby a user can adjust the depth of the stereoscopic image simply and intuitively.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
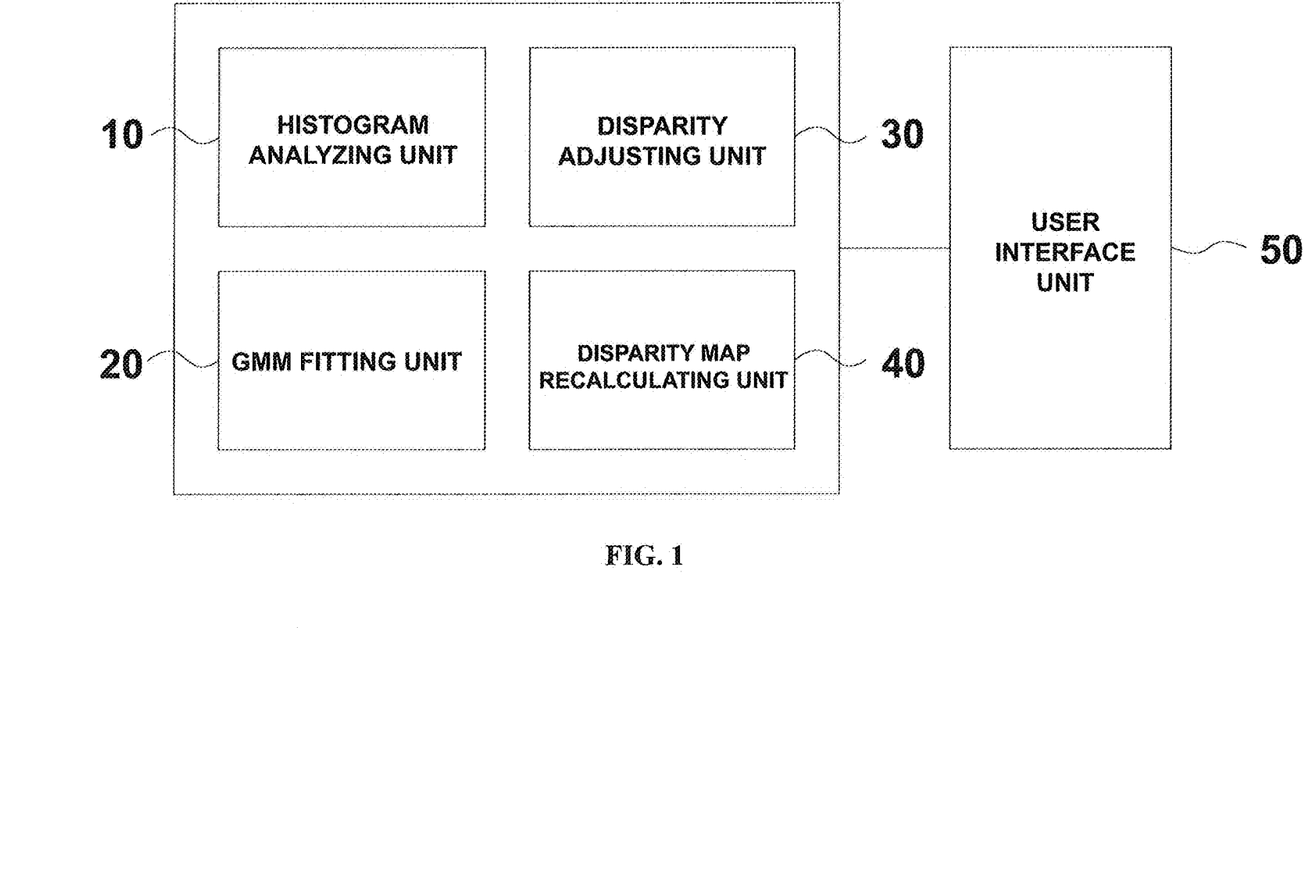
FIG. 1 is a diagram that illustrates a stereoscopic image depth manipulating apparatus according to an embodiment of the present disclosure.

FIG. 1 is a diagram that illustrates a stereoscopic image depth manipulating apparatus according to an embodiment of the present disclosure.

As illustrated in FIG. 1, the stereoscopic image depth manipulating apparatus according to the present disclosure is configured to include a histogram analyzing unit 10, a Gaussian mixture model (GMM) fitting unit 20, a disparity adjusting unit 30, a disparity map recalculating unit 40, a user interface 50, and the like. The stereoscopic image depth manipulating apparatus recalculates a disparity map satisfying user requirements and generates an output image in accordance with the disparity map, thereby allowing an output image, different from an input image, to have depth manipulated by a user.

The histogram analyzing unit 10 acquires a depth distribution chart by performing a history analysis of the disparity map corresponding to an input image.

Figure 2:
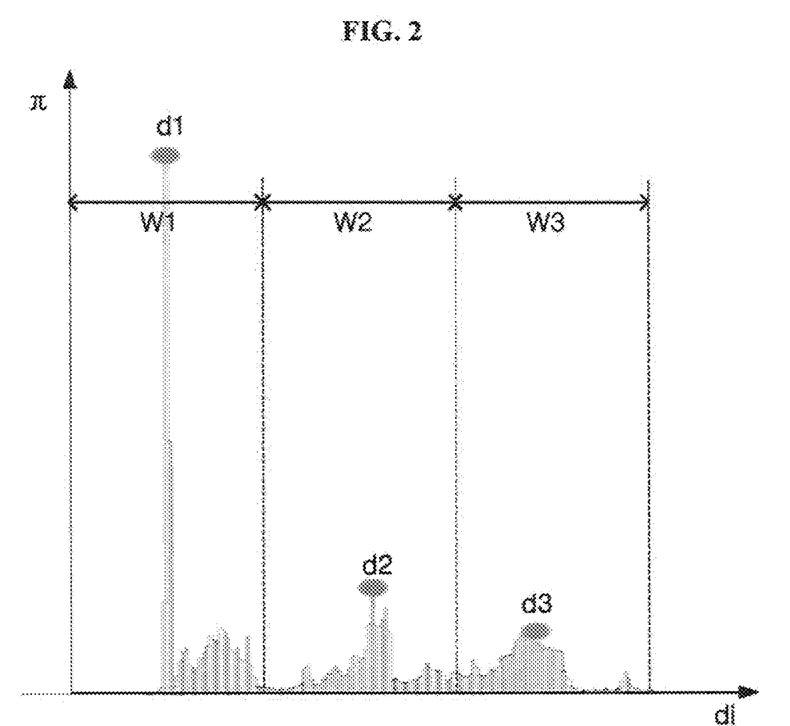
FIG. 2 is a diagram that illustrates a method of analyzing a histogram according to an embodiment of the present disclosure.

For references, the histogram analysis classifies a depth distribution chart of a disparity map, and a disparity maximum value has a feature corresponding to a depth layer including an object main area. In addition, a disparity value, as illustrated in FIG. 2, is a maximum value that can be acquired within the same window, and the number of acquired disparity values (d1, d2, . . . , dn) differs in accordance with a window size (W1, W2, . . . , Wn) used for the histogram analysis. In other words, as the window size decreases, the number of detectable disparity values increases, and accordingly, the number of depth distribution charts that can be classified increases.

Thus, in the present disclosure, the histogram analyzing unit 10 enables a user to freely adjust the window size used for the histogram analysis based on a user's request and allows the number of distribution charts that can be classified to be changed.

Figure 3:
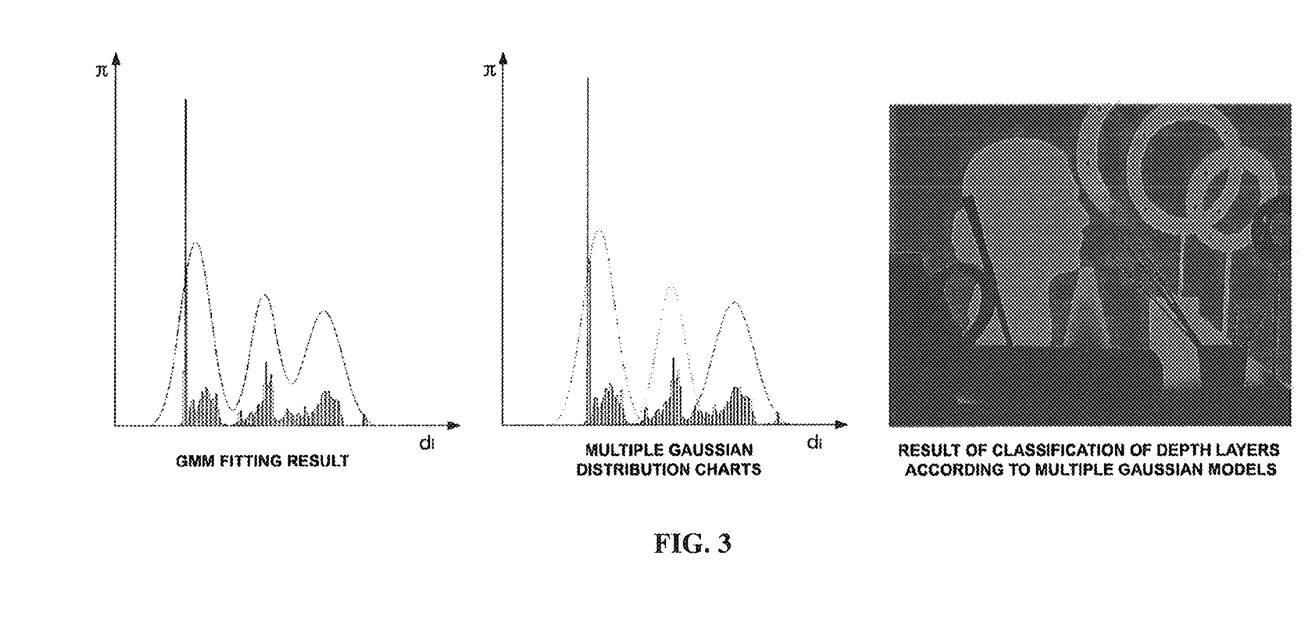
FIG. 3 is a diagram that illustrates a GMM fitting method according to an embodiment of the present disclosure.

The GMM fitting unit 20 acquires multiple Gaussian distribution charts having a mixture weighting factor p, an average μ, a standard deviation s as parameters based on the depth distribution chart, as illustrated in FIG. 3, using a GMM algorithm. Each one of the multiple Gaussian distribution charts represents an object distribution in the same layer. In a case where the same object is divided into mutually-different layers using the mixture weighting factor, the GMM fitting unit 20 extracts multiple depth layers by interpolating a portion in which two layers overlap each other in a disparity adjustment section.

The disparity adjusting unit 30 freely adjusts at least one of a position and a volume of at least one of the multiple depth layers in accordance with a user request and calculates a disparity mapping function corresponding thereto. The following Equation 1 defines a disparity mapping function $d_i'$ used for adjusting the volume of an i-th disparity of a j-th depth layer and a disparity mapping function $d_i''$ used for adjusting the position of the i-th disparity of the j-th depth layer.

$$d_i' = \frac{1}{l}\sum_{j=1}^{l}[d_i - \{(d_i - \mu_i) - (d_i - \mu_i) \cdot v_j\} \cdot \omega_j]$$

$$d_i'' = \frac{1}{l}\sum_{j=1}^{l}\{d_i' - (p_j \cdot \omega_j)\}$$

$$\omega_j = \frac{\pi_j \cdot G_j(d_i)}{\sum_{k=1}^{l} \pi_k \cdot G_k(d_i)}$$

Equation 1

Here, l represents the number of depth layers, $\mu_j$ represents an average of the j-th Gaussian distribution chart, and $p_j$ and $v_j$ represent the position and the volume value of the j-th depth layer adjusted by a user.

In addition, $\omega_{ij}$ represents a weighting factor used for interpolating a disparity change between depth layers for assuring the consistency of a depth change within an object, G represents a Gaussian function configuring the GMM, and π represents a Gaussian mixture weighing factor.

Figure 4:
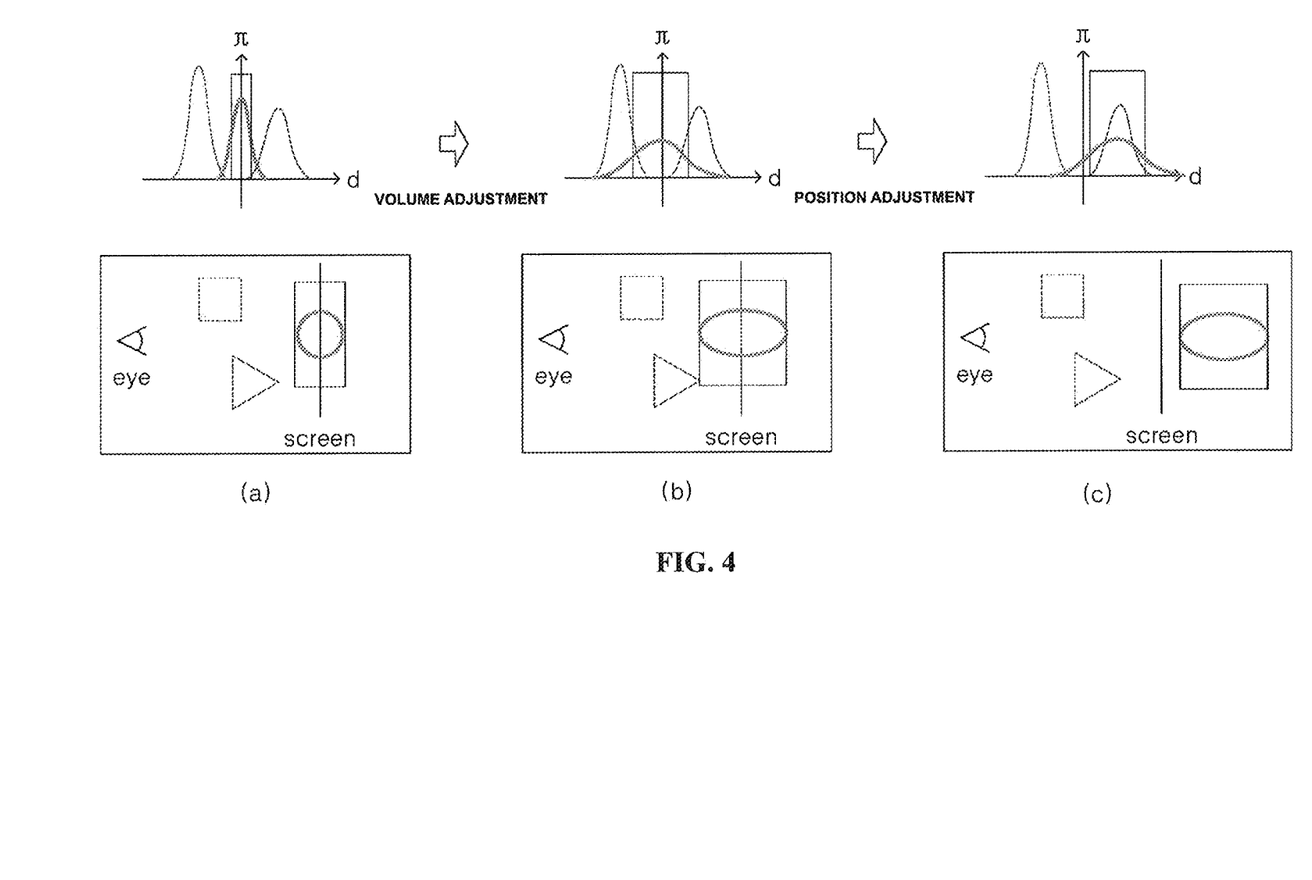
FIGS. 4a to 4c are diagrams that illustrate a method of adjusting a disparity according to an embodiment of the present disclosure.

For example, in a case where the GMM fitting unit 20 acquires depth layers corresponding to a rectangular object, a circular object and a triangular object, as illustrated in FIG. 4*a*, the disparity adjusting unit 30 according to the present disclosure can freely adjust the volume or the position of the circular object through the position or the volume of the depth layer corresponding to the circular object. In other words, the volume of the circular object may be increased, as illustrated in FIG. 4*b*, by adjusting the volume of the depth layer corresponding to the circular object, or the position of the circular object may be moved, as illustrated in FIG. 4*c*, by adjusting the position of the depth layer.

Figure 5:
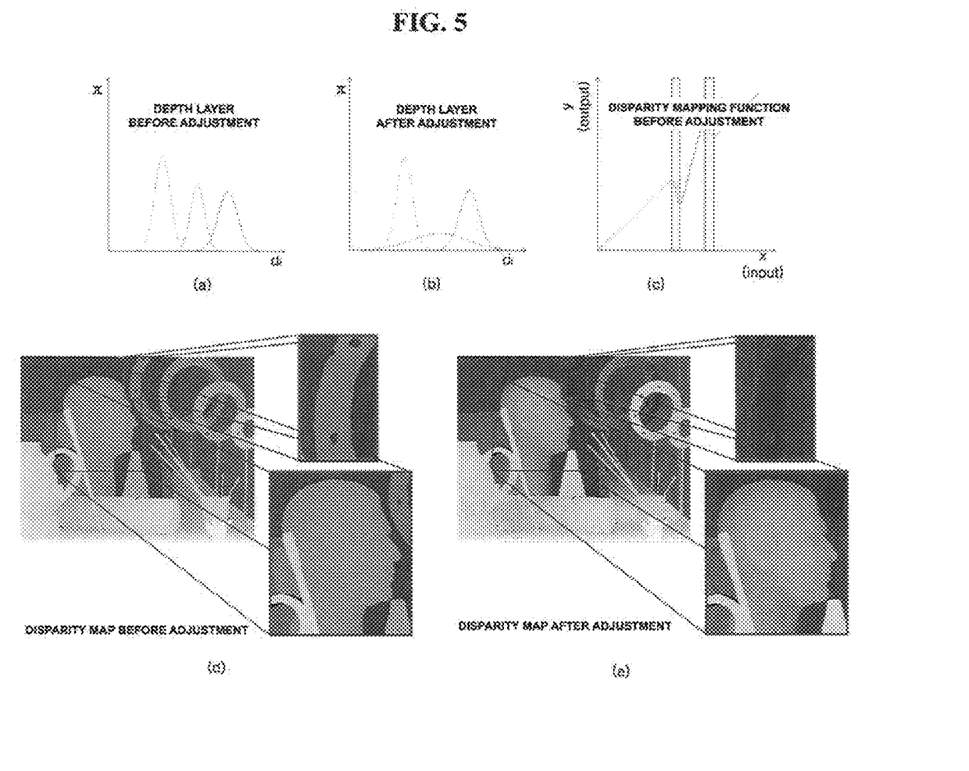
FIGS. 5a to 5e are diagrams that illustrate a depth layer overlapping area generated by the method of adjusting a disparity according to an embodiment of the present disclosure.

However, the disparity mapping function represented in Equation 1 has a feature applied to each disparity value, and this may be a factor for generating an overlapping area as illustrated in FIGS. 5*a* to 5*e*. For example, FIG. 5*a* illustrates a depth layer before adjustment, and FIG. 5*d* illustrates a disparity map before adjustment. When a user selects a green layer and increases a deviation thereof four times as illustrated in FIG. 5*b*, the volume of a head model that is an object corresponding to the green layer can be increased as illustrated in FIG. 5*e*. However, when the disparity range of the green layer is increased as above, the increased disparity range of the green layer penetrates into another layer and, as denoted by a red box illustrated in FIG. 5*e*, has a changed depth order, and the disparity mapping function includes an area, as illustrated in FIG. 5*c*, in which the depth orders overlap each other.

Thus, the disparity map recalculating unit 40 optimizes the disparity mapping function for which the depth overlapping area is generated so as to have the form of a cubic spline curve. Described in more detail, the disparity map recalculating unit 40 according to the present disclosure proposes an energy function defined by the following Equation 2 and acquires a solution of the function using an energy minimization technique, thereby optimizing the disparity mapping graph and acquiring a disparity map corresponding thereto.

$$E = E_{CF} + \lambda_O E_N + \lambda_T E_T \quad \text{Equation 2}$$

Here, E represents an energy function, $E_{CF}$ represents curve-fitting energy, $E_N$ represents non-linearity suppression energy, $E_T$ represents temporal coherence energy, and $\lambda_O$ and $\lambda_T$ represent weighting factors of the non-linearity suppression energy and the temporal coherence energy. However, $\lambda_O$ and $\lambda_T$ are values that can be manipulated by a user.

The curve-fitting energy $E_{CF}$ can be defined as in Equation 3 by allowing the disparity mapping function to have a form similar to a curve on which the user request is reflected.

$$E_{CF} = \sum_i w_i \cdot (y_i - \phi(x_i))^2 \quad \text{Equation 3}$$

$$w_i = \sum_{j=0}^{1} \omega_j \cdot \Omega_j$$

Here, $\phi$ represents a fitting function, x and y represent an input value and an output value of the disparity mapping function, and $\Omega_j$ represents a weighting factor of the j-th depth layer input by a user. In other words, a user can specify a specific depth layer as a more important layer by adjusting a weighting factor (the default value of the weighting factor is "1") of each depth layer.

In the present disclosure, in order to minimize an interpolation that is generated by a curve-fitting operation, spline basic functions, the number of which corresponds to the number of disparity values between a minimum value and a maximum value, are used.

The non-linearity suppression energy $E_N$ has a direct influence on the elimination of an overlapping area of depth layers and can be defined as in Equation 4.

$$E_N = \sum_i \gamma_i \cdot (\phi''(x_i))^2 \quad \text{Equation 4}$$

Here, $\phi''$ represents a derived function (second drive) of $\phi$ representing a change in inclination, and $\gamma_i$ represents a weighting factor of the i-th disparity.

In the present disclosure, by suppressing the non-linearity, the output of the fitting function monotonously changes, and accordingly, the depth overlapping area is eliminated. As in FIG. 7, the weighting factor γ has a feature of having a high value in a depth overlapping area and starting to decrease at an inflection point. In addition, in this disclosure, by using a Gaussian function, a change in the inclination of the depth overlapping area (represented by a green bar) in which the disparity mapping graph is continuous becomes gentle.

The temporal coherence energy $E_T$ is used for assuring a gentle change in depth through an image sequence and can be defined as in Equation 5.

$$E_T = \sum_i (y_i \cdot \check{y}_i)^2 \quad \text{Equation 5}$$

Here, $\check{y}$ is a disparity output of a previous frame.

Figure 6:
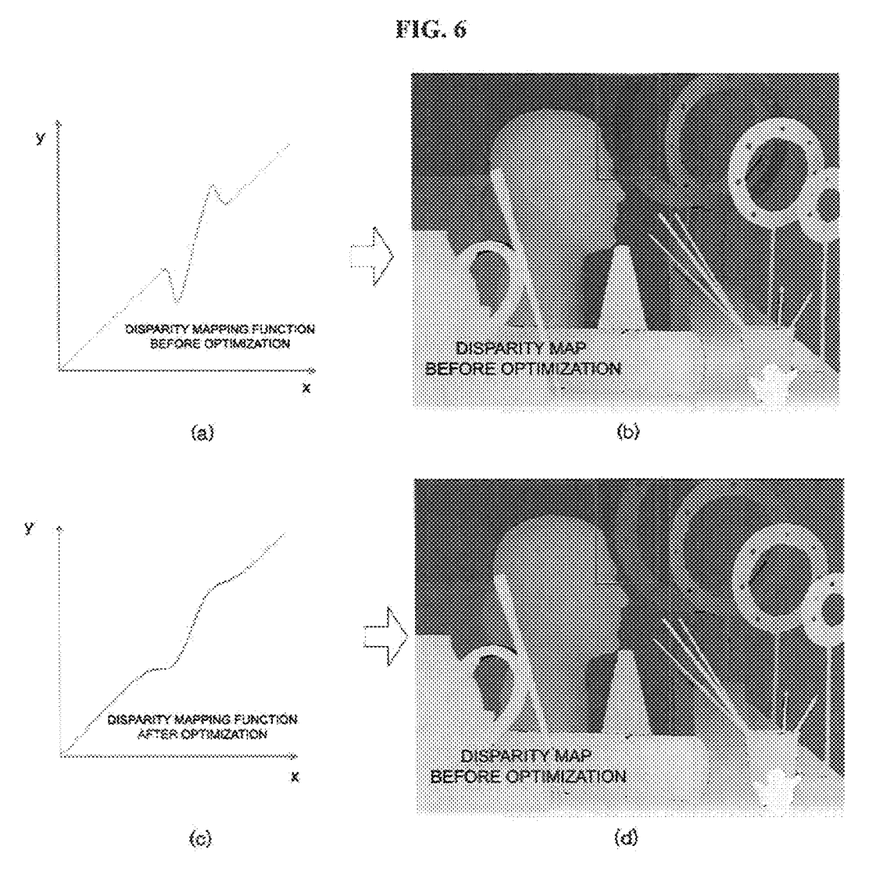
FIGS. 6a to 6d are diagrams that illustrate a method of recalculating a disparity map according to an embodiment of the present disclosure.

In other words, the disparity map recalculating unit 40 according to the present disclosure optimizes a disparity mapping function having an area, in which the depth orders overlap each other as in FIG. 6*a*, as illustrated in FIG. 6*c*. Then, in a disparity map illustrated in FIG. 6*d* corresponding to the disparity mapping function illustrated in FIG. 6*c*, differently from a disparity map illustrated in FIG. 6*b* corresponding to the disparity mapping function illustrated in FIG. 6*a*, each object can normally maintain the original depth order while an increased volume of the head model is included.

The user interface 50 outputs various images and texts so as to enable a user to acquire the operating status of the depth manipulating apparatus and provides various control menus so as to enable the user to actively participate in a depth manipulating operation. Particularly, in the present disclosure, a user can adjust the size of the window used for searching for a depth layer, adjust at least one of the position and the volume of a specific depth layer, or arbitrarily adjust the weighting factor of a specific depth layer through the user interface, whereby the depth manipulating apparatus can change the disparity map by reflecting user requests thereon.

Figure 7:
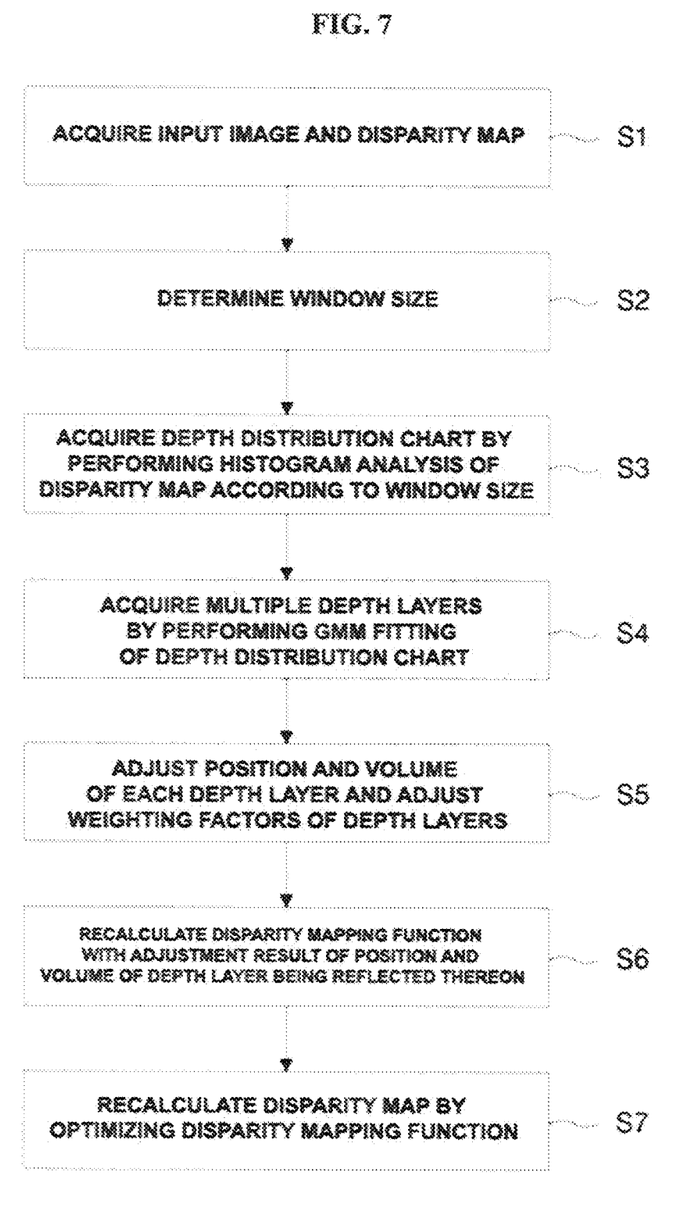
FIG. 7 is a diagram that illustrates a method of manipulating depth of a stereoscopic image according to an embodiment of the present disclosure.

Hereinafter, a method of manipulating depth of a stereoscopic image according to the present disclosure will be described in detail with reference to FIG. 7.

First, when an input image and a disparity map are input (S1), the depth manipulating apparatus inquires a user of a window size used for a histogram analysis and determines the window size. If the user does not perform an additional window size adjusting operation, the depth manipulating apparatus may acquire a window size previously used or a default value set in advance as the window size (S2).

Then, a depth distribution chart is acquired by performing a histogram analysis for the disparity map using the window size acquired through operation S2 (S3), and multiple depth layers are extracted from the depth distribution chart by performing GMM fitting for the depth distribution chart (S4).

When a user selects at least one of the multiple depth layers in such a state, the depth manipulating apparatus allows the user to manipulate at least one of the position, the volume, and the weighting factor of the depth layer selected by the user (S5).

When the operation of manipulating the parameters of the depth layer is completed (S6), the disparity mapping function is recalculated by reflecting the position and the volume of the depth layer manipulated by the user in accordance with Equation 1 described above (S6).

Subsequently, the disparity mapping function recalculated through operation S6 is optimized in accordance with Equations 2 to 5 described above, and the disparity map is recalculated (S7). Then, the depth manipulating apparatus can generate an output image having depth on which the user requirements are reflected through the recalculated disparity map.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

The method of manipulating depth of a stereoscopic image according to the present disclosure can be implemented as a computer-readable code on a computer-readable recording medium. The computer-readable recording medium includes all kinds of recording devices in which data, which can be read by a computer system, is stored. Examples of the recording medium include a ROM, a RAM, a CD-ROM, a magnetic tape, a floppy disk, an optical data storage device, a hard disk, and a flash drive, and the recording medium may be implemented in the form of carrier waves (for example, transmission through the Internet). Furthermore, the computer-readable recording medium may be distributed in computer systems connected through a network, and the computer-readable code may be stored and executed in a distributed manner.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A stereoscopic image depth manipulating apparatus comprising:
   a histogram analyzing unit acquiring a depth distribution chart by performing histogram analysis of a disparity map corresponding to an input image;
   a Gaussian mixture model (GMM) fitting unit acquiring multiple depth layers by performing GMM fitting of the depth distribution chart;
   a disparity adjusting unit adjusting at least one of a position and a volume of at least one of the multiple depth layers and calculating a disparity mapping function on which a result of the adjustment is reflected in response to a user request; and
   a disparity map recalculating unit calculating a new disparity map by optimizing the disparity mapping function, which is calculated by the disparity adjusting unit, wherein the disparity adjusting unit calculates a disparity mapping function $d_i'$ defined by the following equation in a case where a user selects one of the multiple depth layers and adjusts the volume of the selected depth layer, $$d_i' = \frac{1}{l}\sum_{j=1}^{l}[d_i - \{(d_i - \mu_i) - (d_i - \mu_i) \cdot v_j\} \cdot \omega_j]$$

$$\omega_j = \frac{\pi_j \cdot G_j(d_i)}{\sum_{k=1}^{l} \pi_k \cdot G_k(d_i)},$$

and here, $d_i'$ represents a volume-adjusted disparity mapping function, $d_i$ represents a disparity mapping function before adjustment, l represents the number of depth layers, $\mu_j$ represents an average of the j-th Gaussian distribution chart, $v_j$ represents a volume value of the j-th depth layer adjusted by the user, G represents a Gaussian function configuring the GMM, and n represents a Gaussian mixture weighting factor.

2. A stereoscopic image depth manipulating apparatus comprising:
   a histogram analyzing unit acquiring a depth distribution chart by performing histogram analysis of a disparity map corresponding to an input image;
   a Gaussian mixture model (GMM) fitting unit acquiring multiple depth layers by performing GMM fitting of the depth distribution chart;
   a disparity adjusting unit adjusting at least one of a position and a volume of at least one of the multiple depth layers and calculating a disparity mapping function on which a result of the adjustment is reflected in response to a user request; and
   a disparity map recalculating unit calculating a new disparity map by optimizing the disparity mapping function, which is calculated by the disparity adjusting unit, wherein the disparity adjusting unit calculates a disparity mapping function defined by the following equation in a case where a user selects one of the multiple depth layers and adjusts the position of the selected depth layer, $$d_i'' = \frac{1}{l}\sum_{j=1}^{l}\{d_j' - (p_j \cdot \omega_j)\}$$

-continued $$\omega_j = \frac{\pi_j \cdot G_j(d_i)}{\sum_{k=1}^{l} \pi_k \cdot G_k(d_i)},$$

and here, $d_i''$ represents a position-adjusted disparity mapping function, $d_i'$ represents a disparity mapping function before adjustment, l represents the number of depth layers, $p_j$ represents a position value of the j-th depth layer adjusted by the user, G represents a Gaussian function configuring the GMM, and n represents a Gaussian mixture weighting factor.

3. A stereoscopic image depth manipulating apparatus comprising:
   a histogram analyzing unit acquiring a depth distribution chart by performing histogram analysis of a disparity map corresponding to an input image;
   a Gaussian mixture model (GMM) fitting unit acquiring multiple depth layers by performing GMM fitting of the depth distribution chart;
   a disparity adjusting unit adjusting at least one of a position and a volume of at least one of the multiple depth layers and calculating a disparity mapping function on which a result of the adjustment is reflected in response to a user request; and
   a disparity map recalculating unit calculating a new disparity map by optimizing the disparity mapping function, which is calculated by the disparity adjusting unit, wherein the disparity map recalculating unit optimizes the disparity mapping function by acquiring a solution of an energy function defined by the following equation using an energy minimization technique, $$E = E_{CF} + \lambda_0 E_N + \lambda_T E_T$$

$$E_{CF} = E_i w_i \cdot (y_i - \phi(x_i))^2, \ w_i = \sum_{j=0}^{l} \omega_j \cdot \Omega_j \cdot \omega_j = \frac{\pi_j \cdot G_i(d_i)}{\sum_{k=1}^{l} \pi_k \cdot G_k(d_i)}$$

$$E_N = \sum_i \gamma_i \cdot (\phi''(x_i))^2$$

$$E_T = \sum_i (y_i - \tilde{y}_i)^2,$$

and here, E represents an energy function, $E_{CF}$ represents curve-fitting energy, $E_N$ represents non-linearity suppression energy, $E_T$ represents temporal coherence energy, $\lambda_o$ and $\lambda_T$ represent weighting factors of the non-linearity suppression energy and the temporal coherence energy, $\phi$ represents a fitting function, x and y represent an input value and an output value of the disparity mapping function, $\Omega_j$ represents a weighting factor of the j-th depth layer, G represents a Gaussian function configuring the GMM, n represents a Gaussian mixture weighting factor, $\phi''$ represents a derived function (second drive) of $\phi$ representing a change in inclination, $\gamma_i$ represents a weighting factor of the i-th disparity, and $\tilde{y}$ represents a disparity output of a previous frame.

4. The stereoscopic image depth manipulating apparatus of claim 3, wherein the disparity map recalculating unit can change at least one of $\lambda_o$, $\lambda_T$, and $\Omega_j$ in accordance with a request from a user.

5. The stereoscopic image depth manipulating apparatus of claim 1, wherein the disparity adjusting unit calculates a disparity mapping function defined by the following equation in a case where a user selects one of the multiple depth layers and adjusts the position of the selected depth layer, $$d_i'' = \frac{1}{l} \sum_{j=1}^{l} \{d_i' - (p_j \cdot \omega_j)\}$$

$$\omega_j = \frac{\pi_j \cdot G_j(d_i)}{\sum_{k=1}^{l} \pi_k \cdot G_k(d_i)},$$

and here, $d_i''$ represents a position-adjusted disparity mapping function, $d_i'$ represents a disparity mapping function before adjustment, l represents the number of depth layers, $p_j$ represents a position value of the j-th depth layer adjusted by the user, G represents a Gaussian function configuring the GMM, and n represents a Gaussian mixture weighting factor.

6. A method of manipulating depth of a stereoscopic image, the method comprising:
   acquiring a depth distribution chart by determining a window size used for histogram analysis with a user's approval and performing the histogram analysis of a disparity map using the window size;
   acquiring multiple depth layers from the depth distribution chart;
   selecting at least one of the multiple depth layers with a user's approval, adjusting at least one of a position and a volume of the selected depth layer, and then recalculating a disparity mapping function on which a result of the adjustment is reflected; and
   calculating a new disparity map by optimizing the disparity mapping function, which is recalculated in the step of selecting the multiple depth layers, wherein, in the recalculating of a disparity mapping function, a disparity mapping function $d_i'$ defined by the following equation is calculated in a case where a user selects one of the multiple depth layers and adjusts the volume of the selected depth layer, $$d_i' = \frac{1}{l} \sum_{j=1}^{l} [d_i - \{(d_i - \mu_i) - (d_i - \mu_i) \cdot v_j\} \cdot \omega_j]$$

$$\omega_j = \frac{\pi_j \cdot G_j(d_i)}{\sum_{k=1}^{l} \pi_k \cdot G_k(d_i)},$$

and here, $d_i'$ represents a volume-adjusted disparity mapping function, $d_i$ represents a disparity mapping function before adjustment, l represents the number of depth layers, $\mu_j$ represents an average of the j-th Gaussian distribution chart, $v_j$ represents a volume value of the j-th depth layer adjusted by the user, G represents a Gaussian function configuring the GMM, and n represents a Gaussian mixture weighting factor.

7. A method of manipulating depth of a stereoscopic image, the method comprising:
   acquiring a depth distribution chart by determining a window size used for histogram analysis with a user's approval and performing the histogram analysis of a disparity map using the window size;
   acquiring multiple depth layers from the depth distribution chart;

selecting at least one of the multiple depth layers with a user's approval, adjusting at least one of a position and a volume of the selected depth layer, and then recalculating a disparity mapping function on which a result of the adjustment is reflected; and calculating a new disparity map by optimizing the disparity mapping function, which is recalculated in the step of selecting the multiple depth layers, wherein, in the recalculating of a disparity mapping function, a disparity mapping function defined by the following equation is calculated in a case where a user selects one of the multiple depth layers and adjusts the position of the selected depth layer, $$d_i'' = \frac{1}{l}\sum_{j=1}^{l}\{d_i' - (p_j \cdot \omega_j)\}$$

$$\omega_j = \frac{\pi_j \cdot G_j(d_i)}{\sum_{k=1}^{l}\pi_k \cdot G_k(d_i)},$$

and here, $d_i''$ represents a position-adjusted disparity mapping function, $d_i'$ represents a disparity mapping function before adjustment, l represents the number of depth layers, $p_j$ represents a position value of the j-th depth layer adjusted by the user, G represents a Gaussian function configuring the GMM, and n represents a Gaussian mixture weighting factor.

8. A method of manipulating depth of a stereoscopic image, the method comprising:

acquiring a depth distribution chart by determining a window size used for histogram analysis with a user's approval and performing the histogram analysis of a disparity map using the window size;

acquiring multiple depth layers from the depth distribution chart;

selecting at least one of the multiple depth layers with a user's approval, adjusting at least one of a position and a volume of the selected depth layer, and then recalculating a disparity mapping function on which a result of the adjustment is reflected; and calculating a new disparity map by optimizing the disparity mapping function, which is recalculated in the step of selecting the multiple depth layers, wherein, in the calculating of a new disparity map, the disparity mapping function is optimized by acquiring a solution of an energy function defined by the following equation using an energy minimization technique, $$E = E_{CF} + \lambda_0 E_N + \lambda_T E_T$$

$$E_{CF} = E_i w_i \cdot (y_i - \phi(x_i))^2, \; w_i = \sum_{j=0}^{l} \omega_j \cdot \Omega_j, \; \omega_j = \frac{\pi_j \cdot G_i(d_i)}{\sum_{k=1}^{l} \pi_k \cdot G_k(d_i)}$$

$$E_N = \sum_i \gamma_i \cdot (\phi''(x_i))^2$$

$$E_T = \sum_i (y_i \cdot \tilde{y}_i)^2,$$

and here, E represents an energy function, $E_{CF}$ represents curve-fitting energy, $E_N$ represents non-linearity suppression energy, $E_T$ represents temporal coherence energy, $\lambda_o$ and $\lambda_T$ represent weighting factors of the non-linearity suppression energy and the temporal coherence energy, $\phi$ represents a fitting function, x and y represent an input value and an output value of the disparity mapping function, $\Omega_j$ represents a weighting factor of the j-th depth layer, G represents a Gaussian function configuring the GMM, n represents a Gaussian mixture weighting factor, $\phi''$ represents a derived function (second drive) of $\phi$ representing a change in inclination, $\gamma_i$ represents a weighting factor of the i-th disparity, and $\tilde{y}$ represents a disparity output of a previous frame.

9. The method of manipulating depth of a stereoscopic image of claim 8, wherein, in the recalculating of a disparity mapping function, at least one of $\lambda_o$, $\lambda_T$, and $\Omega_j$ is changed in accordance with a request from a user.

10. The method of manipulating depth of a stereoscopic image of claim 6, wherein, in the recalculating of a disparity mapping function, a disparity mapping function defined by the following equation is calculated in a case where a user selects one of the multiple depth layers and adjusts the position of the selected depth layer, $$d_i'' = \frac{1}{l}\sum_{j=1}^{l}\{d_i' - (p_j \cdot \omega_j)\}$$

$$\omega_j = \frac{\pi_j \cdot G_j(d_i)}{\sum_{k=1}^{l}\pi_k \cdot G_k(d_i)},$$

and here, $d_i''$ represents a position-adjusted disparity mapping function, $d_i'$ represents a disparity mapping function before adjustment, l represents the number of depth layers, $p_j$ represents a position value of the j-th depth layer adjusted by the user, G represents a Gaussian function configuring the GMM, and n represents a Gaussian mixture weighting factor.

11. The stereoscopic image depth manipulating apparatus of claim 1, wherein the histogram analyzing unit further includes a function of manipulating a window size used for the histogram analysis in response to a user request.

12. The stereoscopic image depth manipulating apparatus of claim 2, wherein the histogram analyzing unit further includes a function of manipulating a window size used for the histogram analysis in response to a user request.

13. The stereoscopic image depth manipulating apparatus of claim 3, wherein the histogram analyzing unit further includes a function of manipulating a window size used for the histogram analysis in response to a user request.

\* \* \* \* \*